United States Patent [19]

Tsuchiya et al.

[11] Patent Number: 4,557,492
[45] Date of Patent: Dec. 10, 1985

[54] NITRIDED PISTON RING WITH OUTER LAYER ON SURFACE

[75] Inventors: Takeshi Tsuchiya; Shuji Samejima; Tsutomu Kimura, all of Saitama, Japan

[73] Assignee: Nippon Piston Ring Co., Ltd., Tokyo, Japan

[21] Appl. No.: 706,095

[22] Filed: Feb. 27, 1985

[30] Foreign Application Priority Data

Mar. 7, 1984 [JP] Japan .................... 59-42176

[51] Int. Cl.[4] ............... F16J 9/00; F02F 5/00
[52] U.S. Cl. ..................... 277/216; 277/224; 277/235 A
[58] Field of Search ............ 277/1, 216, 223, 224, 277/234, 235 R, 235 A, 236, DIG. 6; 29/156.6, 156.63; 75/244, 245, 126 J; 148/12 R, 15.5, 16.6

[56] References Cited

U.S. PATENT DOCUMENTS 2,905,512 9/1959 Anderson .................. 277/224 X
4,299,401 11/1981 McCormick ................ 277/216

FOREIGN PATENT DOCUMENTS 1195110 6/1965 Fed. Rep. of Germany ...... 277/224
2934027 4/1980 Fed. Rep. of Germany ...... 277/224
 662213 12/1951 United Kingdom .......... 277/235 A
1057570 2/1967 United Kingdom .......... 277/235 A

OTHER PUBLICATIONS

*The Iron Age*, "Case Hardening with Nitrides", Aug. 5, 1926, pp. 340 and 341.

*Primary Examiner*—Robert S. Ward
*Attorney, Agent, or Firm*—Finnegan, Henderson, Farabow, Garrett & Dunner

[57] ABSTRACT

A piston ring with a nitriding layer on entire surfaces thereof except an outer peripheral surface, and a plating or a spraying layer on the outer peripheral surface of the piston ring.

5 Claims, 2 Drawing Figures

NITRIDED PISTON RING WITH OUTER LAYER ON SURFACE

BACKGROUND OF THE INVENTION

The present inveniton relates to a piston ring for use in an internal combustion engine, and more particularly, to a type thereof capable of being employed in the internal combustion engine which uses high lead content fuel or which is exposed to corrosive atmosphere.

At present, while employment of non lead or lead free fuel has been progressing in light of the problem of public pollution, the employment of an internal combustion engine which uses high lead content fuel is also available throughout the world. In the internal combustion engine employing high lead content fuel, in order to avoid excessive wear, thick chromium plating is provided onto an outer peripheral surface of the ring so as to sustain extensively corrosive atmosphere such as HCl atmosphere.

However, sufficient effect has not been obtainable in light of productivity and cost.

On the other hand, a piston ring whose sliding portion is subjected to nitriding treatment has been developed. However, excessive wear such as scuffing may occur in accordance with specific operating condition of the engine. U.S. Pat. No. 4,407,515, commonly assigned, discloses a combined oil ring in which spacer expander and side rails are subjected to low temperature gas nitriding treatment. Further, co-pending U.S. application Ser. No. 571,630 discloses a piston ring having a ring body made of cast iron or steel having its entire surface provided with a soft-nitride layer, and outer peripheral surface provided with a spraying layer.

SUMMARY OF THE INVENTION

Therefore, an object of the present invention is to provide a piston ring having an improved wear and scuffing resistance.

Briefly, and in accordance with the present invention, a piston ring includes a piston ring body formed of cast iron or steel, and nitriding layer is provided at entire surfaces of the piston ring body except an outer peripheral surface thereof, and a plating or spraying layer is formed on the outer peripheral surface of the piston ring.

DETAILED DESCRIPTION OF THE INVENTION

This invention will be described with reference to the accompanying drawings.

Figure 1:
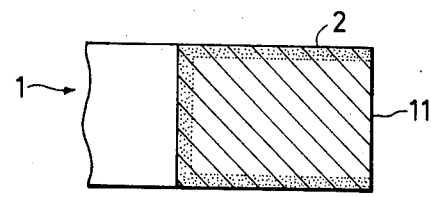
FIG. 1 is a cross-sectional view showing a condition of first process (nitriding treatment); and, FIG. 2 is a cross-sectional view showing a resultant piston ring of the present invention.

First, as shown in FIG. 1, entire surfaces except outer peripheral surface 11 of a piston ring are provided with nitriding layer 2.

Figure 2:
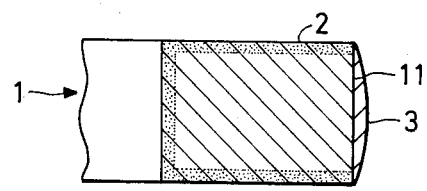

Second, as shown in FIG. 2, the outer peripheral surface 11 of the piston ring 1 is provided with plating or spraying layer 3.

In this case, plating material may be chromium or a dispersion of discrete particles within a plated matrix compatible with a material of a cylinder or cylinder liner, and the spraying material may be ferrous material or molybdenum.

According to the present invention, a piston ring is formed of cast iron or steel, and nitriding treatment is subjected to the entire surfaces of the piston ring except outer peripheral surface thereof, and subsequent plating or spraying layer is subjected to the outer peripheral surface.

As is mentioned above, since the outer peripheral surface of the piston ring is provided with plating or spraying layer instead of nitriding layer, prevented is excessive wear, such as scuffing due to sliding contact of the nitriding layer with an opponent member, and piston ring of the invention can also eliminate impact wear due to the repeated impacts between the ring and the ring groove, because of the formation of the nitriding layer. Further, wear resistivity at the sliding surface can be improved because of synergetic effect brought by the employment of the nitriding layer and the plating or spraying layer.

What is claimed is:

1. A piston ring comprising; a piston ring body formed of one of cast iron and steel, a nitriding layer provided on entire surfaces except an outer peripheral surface of said piston ring body, and one of plating and spraying layer formed on said outer peripheral surface of said piston ring body.

2. A piston ring as claimed in claim 1, wherein said plating is formed of chromium.

3. A piston ring as claimed in claim 1, wherein said material is formed of a dispersion of discrete particles within a plated matrix.

4. A piston ring as claimed in claim 1, wherein said spraying layer is formed of ferrous material.

5. A piston ring as claimed in claim 1, wherein said spraying layer is formed of molybdenum.

* * * * *